United States Patent
Fukui et al.

(10) Patent No.: US 10,025,019 B2
(45) Date of Patent: Jul. 17, 2018

(54) LINE LIGHTING DISPLAY DEVICE AND LIGHT GUIDE BODY

(71) Applicant: Panasonic Intellectual Property Management Co., Ltd., Osaka (JP)

(72) Inventors: Atsushi Fukui, Osaka (JP); Tomohisa Sakaguchi, Kyoto (JP); Kenichiro Mase, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 50 days.

(21) Appl. No.: 15/328,016

(22) PCT Filed: May 10, 2016

(86) PCT No.: PCT/JP2016/002285
§ 371 (c)(1),
(2) Date: Jan. 20, 2017

(87) PCT Pub. No.: WO2017/017869
PCT Pub. Date: Feb. 2, 2017

(65) Prior Publication Data
US 2017/0219761 A1    Aug. 3, 2017

(30) Foreign Application Priority Data
Jul. 29, 2015 (JP) ................. 2015-149090

(51) Int. Cl.
*F21V 7/04* (2006.01)
*F21V 8/00* (2006.01)

(52) U.S. Cl.
CPC ......... *G02B 6/0036* (2013.01); *G02B 6/0031* (2013.01); *G02B 6/0038* (2013.01)

(58) Field of Classification Search
CPC ... G02B 6/0036; G02B 6/0031; G02B 6/0038
(Continued)

(56) References Cited

U.S. PATENT DOCUMENTS

| | | | | |
|---|---|---|---|---|
| 5,128,842 A | * | 7/1992 | Kenmochi | G02B 6/0061 200/314 |
| 5,467,208 A | * | 11/1995 | Kokawa | F21V 5/02 349/112 |

(Continued)

FOREIGN PATENT DOCUMENTS

| | | |
|---|---|---|
| JP | 2000-305073 | 11/2000 |
| JP | 2002-538577 | 11/2002 |

(Continued)

OTHER PUBLICATIONS

International Search Report of PCT application No. PCT/JP2016/002285 dated Aug. 16, 2016.

*Primary Examiner* — Bryon T Gyllstrom
(74) *Attorney, Agent, or Firm* — Panasonic IP Management; Kerry S. Culpepper

(57) ABSTRACT

To easily increase display quality of light even in a case of a long light guide body. Depth h1 of a first dot (106) is larger than depth h2 of a second dot (108) in the vicinity of a light source, and, as a location comes closer to an end on an opposite side to the light source, depth h1 of the first dot (106) is reduced, and depth h2 of the second dot (108) is increased. Therefore, it is possible to easily increase display quality of light even in a case of a long light guide body.

10 Claims, 17 Drawing Sheets

(58) Field of Classification Search
USPC .......................................................... 362/606
See application file for complete search history.

(56) References Cited

U.S. PATENT DOCUMENTS

| | | | | |
|---|---|---|---|---|
| 5,735,590 | A * | 4/1998 | Kashima | G02B 6/0038 362/23.15 |
| 6,454,452 | B1 * | 9/2002 | Sasagawa | G02B 6/0061 349/65 |
| 6,712,481 | B2 * | 3/2004 | Parker | A61M 21/02 362/330 |
| 6,755,545 | B2 * | 6/2004 | Lee | G02B 6/0036 362/23.15 |
| 7,001,035 | B2 * | 2/2006 | Kawakami | G02B 6/0016 362/561 |
| 7,588,365 | B2 * | 9/2009 | Katsumata | G02B 6/0043 362/623 |
| 2003/0210222 | A1 * | 11/2003 | Ogiwara | G02B 6/0036 345/103 |
| 2007/0189040 | A1 * | 8/2007 | Chi | G02B 6/0036 362/620 |
| 2009/0086509 | A1 * | 4/2009 | Omori | G02B 6/0036 362/628 |
| 2009/0207344 | A1 | 8/2009 | Ono et al. | |

FOREIGN PATENT DOCUMENTS

| | | |
|---|---|---|
| JP | 2009-224316 | 10/2009 |
| JP | 2013-045671 | 3/2013 |
| WO | 2000/050807 | 8/2000 |

* cited by examiner

LINE LIGHTING DISPLAY DEVICE AND LIGHT GUIDE BODY

CROSS-REFERENCE TO RELATED APPLICATIONS

This application is a U.S. national stage application of the PCT International Application No. PCT/JP2016/002285 filed on May 10, 2016, which claims the benefit of foreign priority of Japanese patent application No. 2015-149090 filed on Jul. 29, 2015, the contents all of which are incorporated herein by reference.

TECHNICAL FIELD

The present invention relates to a light guide body which reflects a light beam from a light source and performs lighting, and a line lighting display device having the light guide body.

BACKGROUND ART

In the related art, there is a line lighting display device in which light is incident to an edge surface of a light guide body, and the light propagates inside the light guide body through total reflection, and is emitted from an upper surface of the light guide body by prisms or dots disposed on a lower surface of the light guide body. Regarding a structure of prisms or dots formed on a light guide body lower surface, there is a structure in which a section thereof has a simple triangular shape, or a structure in which a recessed and smoothly curved surface is disposed between triangular prisms. For example, there is a light guide body having a shape disclosed in PTL 1 as illustrated in FIG. 24.

In FIG. 24, the reference numeral 6 indicates a light guide body, the reference numeral 8 indicates a prism whose section has a triangular shape, and the reference numeral 9 indicates a recessed and smoothly curved surface disposed between the prisms. If light propagating through light guide body 6 is incident to prisms 8, the light is emitted to the outside from light guide body 6, and if the light is incident to curved surfaces 9 between the prisms, the light is diffused. Disposed curved surface 9 diffuses light propagating through light guide body 6, and prism 8 increases spreading of light emitted from light guide body 6.

CITATION LIST

Patent Literature

PTL 1: Japanese Patent Unexamined Publication No. 2013-45671

SUMMARY OF THE INVENTION

However, in the configuration of the related art, if the intensities of light emitted at a location close to and a location separated from a light source are made to be the same as each other in a case where the light guide body is long, a depth of a prism formed on the light guide body lower surface is required to be considerably small since an amount of light propagating through the light guide body is considerably large in the vicinity of the light source in the light guide body. This tendency becomes more remarkable as a light guide body becomes longer. Therefore, in a case where a light guide body is long, very minute prisms are required to be formed in the vicinity of a light source, and thus it is difficult to form prisms. If a depth of a prism is to be increased, it is necessary to increase an arrangement interval of prisms, and this causes a problem that light becomes uneven and thus display quality deteriorates. Thus, particularly, there is a problem in that it is hard to handle a display pattern in which a light source side is dark, and a location becomes brighter as the location becomes more distant from the light source.

In order to solve the problem of the related art, an object of the present invention is to easily increase display quality of light even in a case of a long light guide body.

In order to achieve the object, according to one embodiment of the present invention, there is provided a light guide body which has an upper surface and a lower surface, and causes at least some of light which is incident from one end thereof to propagate to the other end thereof so that irradiation light is emitted from the upper surface, the light guide body including first dots that are formed from the lower surface toward the upper surface and are arranged on the lower surface; and second dots that are formed from the lower surface toward the upper surface and are arranged on the lower surface. At least some of the light reflected at the second dots becomes the irradiation light, and a plurality of pairs each of which is formed of a first dot and a second dot adjacent to each other are arranged. In each pair, the first dot is disposed beside the second dot on the one end, and, in each pair, an inclined angle of a surface of the first dot on the one end with respect to the lower surface is smaller than an inclined angle of a surface of the second dot on the one end with respect to the lower surface. In a pair disposed at a position closest to the one end, a depth of the first dot is larger than a depth of the second dot, and, in pairs adjacent to each other, a depth of the first dot is increased as the first dot comes closer to the one end, and a depth of the second dot is reduced as the second dot comes closer to the one end.

According to another embodiment of the present invention, there is provided a line lighting display device including the light guide body; and a light source that is disposed on the one end of the light guide body and applies the light to the inside of the light guide body.

As mentioned above, a depth of a first dot is larger than a depth of a second dot in the vicinity of a light source, and, as a location comes closer to an end on an opposite side to the light source, the depth of the first dot is reduced, and the depth of the second dot is increased. Therefore, it is possible to easily increase display quality of light even in a case of a long light guide body.

DESCRIPTION OF EMBODIMENTS

Hereinafter, embodiments of the present invention will be described with reference to the drawings.

Embodiment 1

Figure 1:
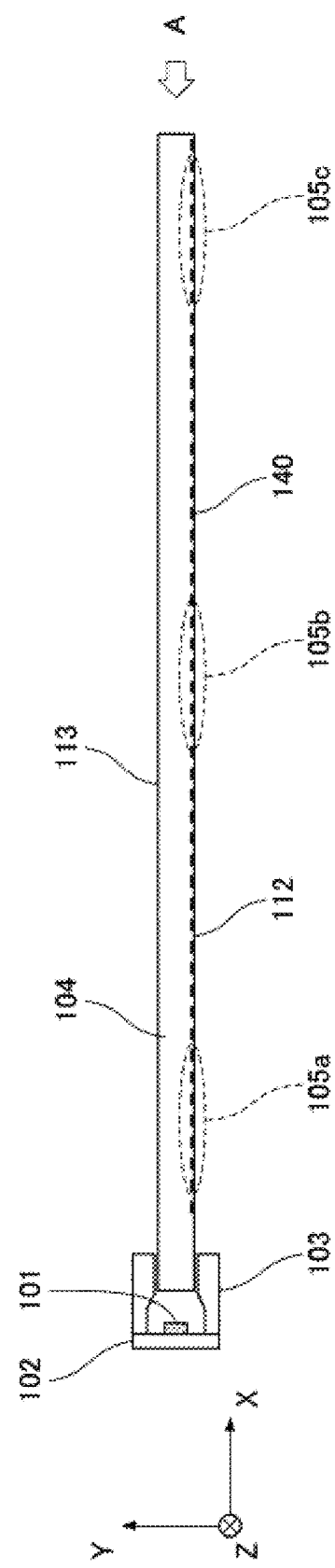
FIG. 1 is a schematic diagram illustrating a line lighting display device in one embodiment of the present invention.
Figure 2:
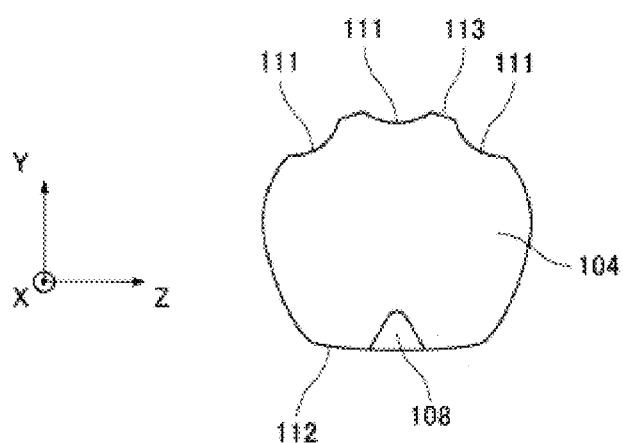
FIG. 2 is a schematic diagram illustrating the line lighting display device in one embodiment of the present invention.
Figure 3:
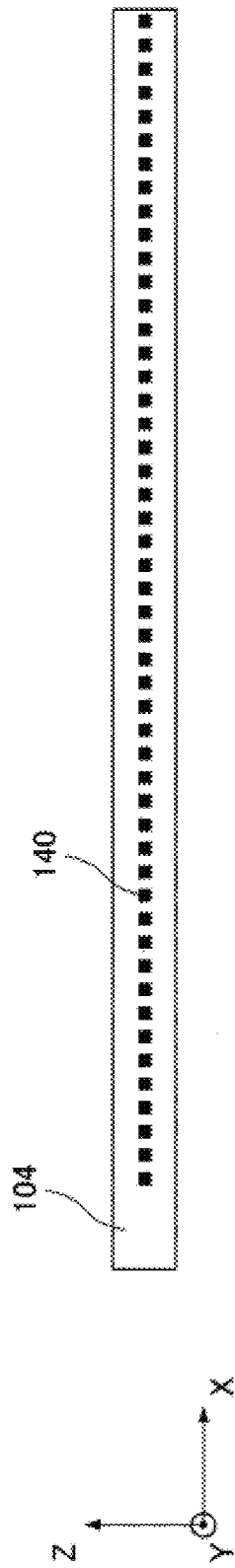
FIG. 3 is a schematic diagram illustrating the line lighting display device in one embodiment of the present invention.

FIGS. 1 to 3 are schematic diagrams illustrating a line lighting display device in one embodiment of the present invention. FIG. 1 is a diagram illustrating light guide body 104 in a longitudinal direction thereof, and FIG. 2 is a diagram in which light guide body 104 is viewed from an arrow A direction in FIG. 1. FIG. 3 is a diagram in which light guide body 104 illustrated in FIG. 1 is viewed from a Y axis direction.

In FIG. 1, as coordinate axes, the drawing surface rightward direction is taken as an X axis, the upper direction is taken as a Y axis, and the drawing surface depth direction is taken as a Z axis.

Light source 101 is formed of an LED or the like. Light source board 102 is provided with electrical wirings for light source 101, and light source 101 is disposed thereon. A surface of light source board 102 on which light source 101 is disposed is coated with white paint or the like so as to increase light reflectance.

Reflector 103 is disposed to surround light source 101 and light guide body 104, and prevents light from light source 101 from leaking to the outside and thus the light is emitted inward of light guide body 104. Reflector 103 has an inner surface made of a material with high reflectance. For example, the inner surface is a diffusion surface with high reflectance made of a resin having fine bubbles, or is coated with white paint.

Light guide body 104 is made of a material having high light transmittance, and has a smoothly curved or linear long rod shape. A material of light guide body 104 is, for example, a resin such as acryl or polycarbonate, or glass. Since light guide body 104 is disposed so that the X axis direction is a longitudinal direction, and light is incident thereto from light source 101, the light is incident from an edge surface on a side where light source 101 is provided, that is, from a negative X axis direction. Light guide body upper surface 113 is a surface of light guide body 104 in a positive Y axis direction. Light guide body upper surface 113 has an aspherical lens shape in a YZ plane, and a focal point position is located at the bottom center of second dot 108 in contact with light guide body lower surface 112, second dot 108 being formed on light guide body lower surface 112 which is an opposite surface to light guide body upper surface 113. Light which is reflected at the second dot and is emitted from light guide body upper surface 113 is converted into substantially parallel light.

In FIG. 2, a plurality of grooves 111 are formed along the X axis direction on light guide body upper surface 113. Grooves 111 are disposed so as not to overlap each other with an interval, that is, so as to leave the aspherical lens shape of light guide body upper surface 113. A shape of groove 111 is a spherical lens shape or an aspherical lens shape having a focal length which is different from that of the aspherical lens shape of light guide body upper surface 113. For example, a sectional shape thereof in the YZ plane is a recessed circular arc shape. Grooves 111 diffuse light emitted from second dot 108 of light guide body lower surface 112.

Figure 4:
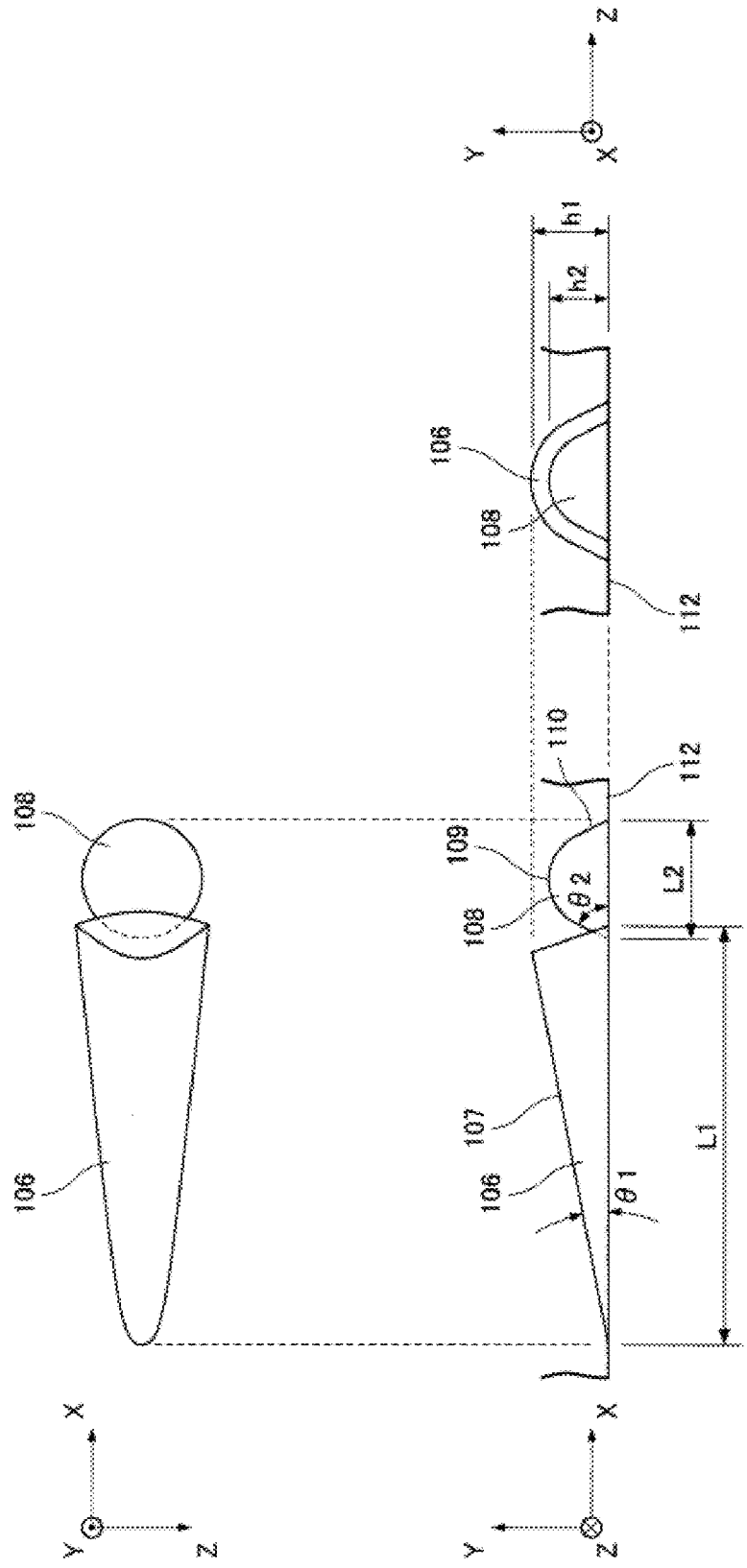
FIG. 4 is a schematic diagram illustrating a second dot formed on a light guide body lower surface in one embodiment of the present invention.
Figure 5:
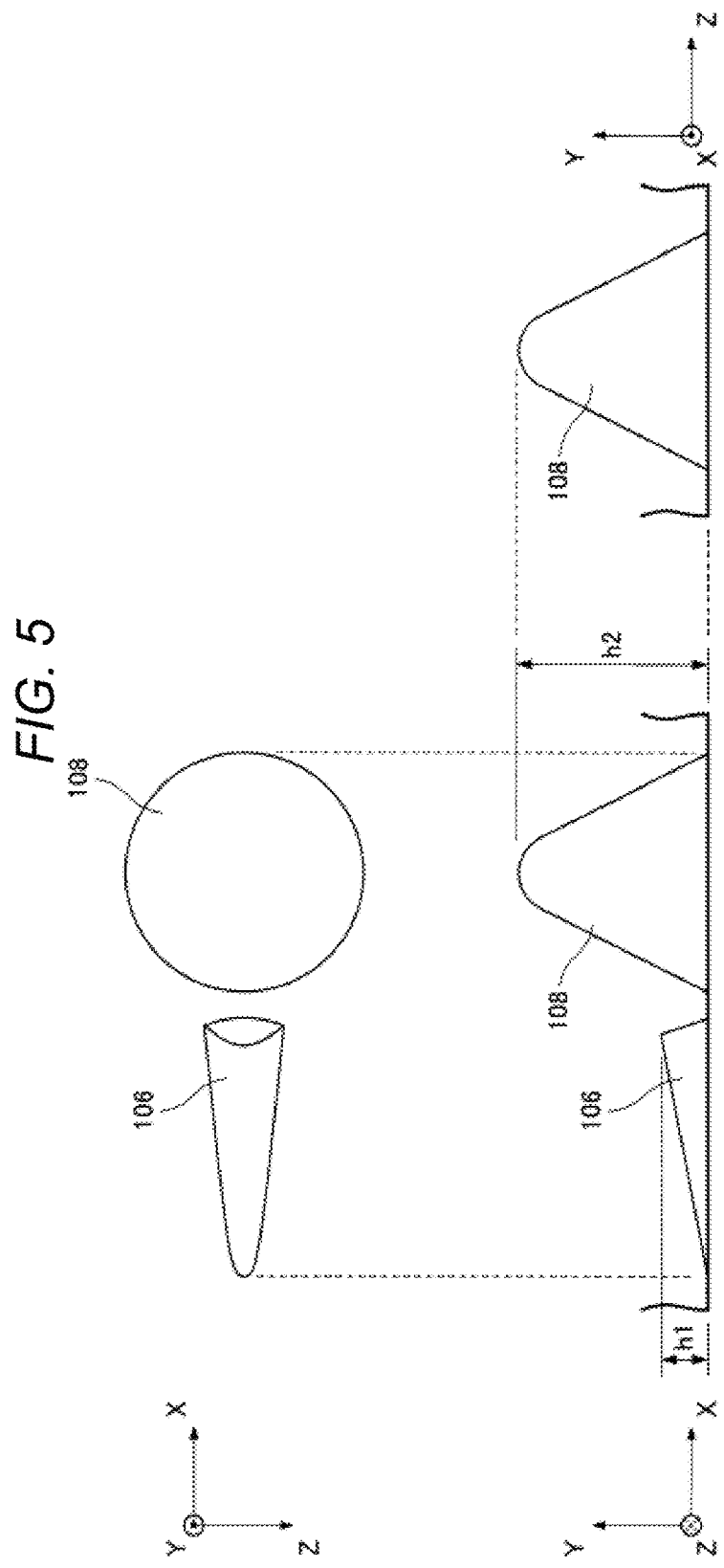
FIG. 5 is a schematic diagram illustrating the second dot formed on the light guide body lower surface in one embodiment of the present invention.
Figure 6:
FIG. 6 is a schematic diagram illustrating the second dot formed on the light guide body lower surface in one embodiment of the present invention.

FIGS. 4 to 6 are schematic diagrams illustrating the second dot formed on the light guide body lower surface in one embodiment of the present invention.

As illustrated in FIG. 4, light guide body lower surface 112 is a surface of light guide body 104 in the negative Y axis direction. A plurality of first dots 106 and a plurality of second dots 108 are formed on light guide body lower surface 112. In first dots 106 and second dots 108 formed on a light guide body lower surface 112, depths of the dots may change according to a distance from a light source side edge surface of light guide body 104, and overlapping between the first dot and the second dot or a gap between the first dot and the second dot may change.

As illustrated in FIGS. 1 and 3, arrangement 140 indicates arrangement of the first dots and second dots arranged on light guide body lower surface 112.

In FIG. 3, arrangement 140 of the first dots and the second dots is disposed near the center of light guide body lower surface 112 of light guide body 104 along light guide body 104.

FIGS. 4 to 6 are diagrams illustrating states of first dot 106 and second dot 108 formed on light guide body lower surface 112. In FIGS. 4 to 6, the same constituent elements as in FIGS. 1 to 3 are given the same reference numerals, and description thereof will be omitted.

FIG. 4 illustrates first dot 106 and second dot 108 at position 105a on light guide body lower surface 112 in the vicinity of light source 101 in FIG. 1. FIG. 5 illustrates first dot 106 and second dot 108 at position 105b on light guide body lower surface 112 in the vicinity of the center of light guide body 104 in FIG. 1, and FIG. 6 illustrates first dot 106 and second dot 108 at position 105c on light guide body lower surface 112 in the vicinity of an opposite side of light guide body 104 to the light source in FIG. 1.

In FIG. 4, first dot 106 protrudes inward of light guide body 104 with respect to light guide body lower surface 112, and forms a recessed dot when viewed from the outside of the light guide body. First dot 106 has a triangular pyramid shape with a round ridge line portion and the center in the X direction, and inclined surface 107 on the light source side forms small angle θ1 with light guide body lower surface 112 in the XY plane. Angle θ1 is preferably a small angle which is more than 0 degrees and is equal to or less than about 10 degrees.

Second dot 108 protrudes inward of light guide body 104 with respect to light guide body lower surface 112 and forms a recessed dot when viewed from the outside of light guide body 104. Second dots 108 are disposed at the substantially same interval in the longitudinal direction, that is, the X axis direction on light guide body lower surface 112. Second dot 108 is a rotation symmetric body with a central axis in the Y axis direction, a tip end thereof is curved surface 109, and side surface 110 thereof has a conical shape and forms angle θ2 with light guide body lower surface 112. If angle θ2 is set to an angle of about 45° to 70°, when light propagating through the light guide body is reflected at side surface 110 of the second dot, the light is emitted in a front direction of light guide body 104, that is, the Y axis direction.

As illustrated in FIGS. 1 and 4, at position 105a close to light source 101 on light guide body lower surface 112, first dot 106 and second dot 108 form a pair, and first dot 106 and second dot 108 are disposed in this order from light source 101 side in each pair. In other words, second dot 108 is disposed further in the positive X axis direction than first dot 106. A part of second dot 108 on light source 101 side, that is, in the negative X axis direction may be disposed to overlap first dot 106. In other words, the mutual recessed shapes of first dot 106 and second dot 108 overlap each other. If a length of first dot 106 in the XY plane on light guide body lower surface 112 is indicated by L1, and a length of second dot 108 is indicated by L2, a relationship of L1>L2 is satisfied. A relationship between angle θ1 of first dot 106 and angle θ2 of side surface 110 of second dot 108 with respect to light guide body lower surface 112 satisfies θ1<θ2. A sectional shape of the first dot and a sectional shape of the second dot in the YZ plane are substantially the same as each other, and first dot 106 is disposed to be slightly larger than second dot 108. First dot 106 is formed so that depth h1 is reduced as the first dot becomes more distant from light source 101. On the other hand, second dot 108 is formed so that depth h2 is increased as the second dot becomes more distant from light source 101. In a pair of first dot 106 and second dot 108, a relationship of h1>h2 is satisfied. At position 105a, a difference between h1 and h2 may be gradually reduced as a location becomes more distant from light source 101.

In FIG. 5, first dot 106 is separated from second dot 108, and depth h1 of first dot 106 is larger than depth h2 of second dot 108, that is, a relationship of h1<h2 is satisfied. At position 105b, a difference between h1 and h2 may be gradually increased as a location becomes more distant from light source 101. A gap between first dot 106 and second dot 108 may be increased as a location becomes more distant from light source 101. In the description of FIG. 4, as an example, a description has been made of a case where first dot 106 overlaps second dot 108 in the vicinity of light source 101, but the first dot and the second dot is not necessarily required to overlap each other. That is, first dot 106 and second dot 108 may be disposed to be sufficiently close to each other, and a gap therebetween may be increased as a location becomes more distant from the light source.

As illustrated in FIG. 6, at position 105c, first dot 106 is not present, and only second dot 108 is present.

In FIG. 1, position 105a is located on lower surface 112 of light guide body 104 in the vicinity of light source 101, position 105b is located on lower surface 112 in the vicinity of the center of light guide body 104, and position 105c is located on lower surface 112 in the vicinity of the edge surface of light guide body 104 on the opposite side to light source 101.

A description will be made of an operation of the line lighting display device configured in the above-described way.

Figure 7:
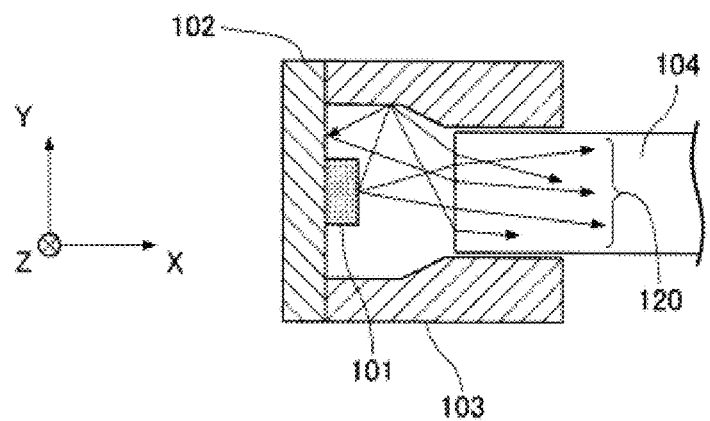
FIG. 7 is a diagram illustrating light which is incident to a light guide body from a light source in one embodiment of the present invention.

FIG. 7 is a diagram illustrating a portion where light is incident to light guide body 104 from light source 101 in FIG. 1. In FIG. 7, the same constituent elements as in FIG. 1 are given the same reference numerals, and description thereof will be omitted.

Most of light emitted from light source 101 is directly incident to light guide body 104 from the edge surface of light guide body 104 in the negative X axis direction. Among light beams emitted from light source 101, light beams which are not directly incident to light guide body 104 and are reflected at reflector 103 or light source board 102 are diffused and reflected, and some of the light beams are incident to reflector 103 or light source board 102 again, and the others are incident from the edge surface of light guide body 104 in the negative X axis direction. Light beams 120 which are incident from the edge surface of light guide body 104 in the negative X axis direction travel inside light guide body 104 in the X axis direction, and are totally reflected at interfaces of light guide body 104, that is, light guide body upper surface 113 and light guide body lower surface 112 so as to propagate. Since light guide body 104 has a linear shape or a smoothly curved shape, light which is incident from the edge surface in the negative X axis direction is totally reflected so as to propagate without leaking out of light guide body 104.

Figure 8:
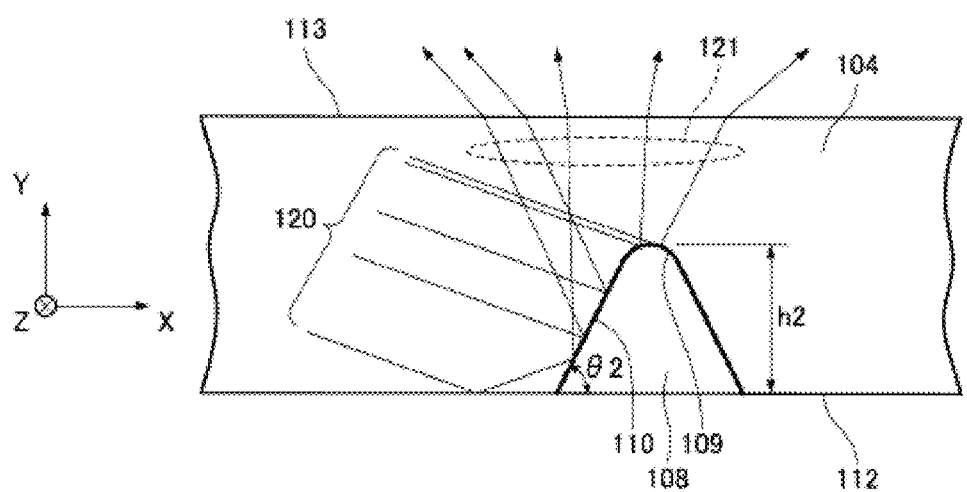
FIG. 8 is a diagram illustrating light reflection at the second dot in an XY plane in one embodiment of the present invention.

FIG. 8 is a diagram illustrating a state in which light is emitted from light guide body 104 by second dot 108 formed in light guide body 104. In FIG. 8, the same constituent elements as in FIG. 1 are given the same reference numerals, and description thereof will be omitted.

If light beams 120 propagating through light guide body 104 are incident to and reflected at second dot 108, an angle of light beams 120 greatly changes, and thus light beams 120 are converted into light beams 121 with angles close to the Y axis direction.

Since second dot 108 has a triangular pyramid shape in which the tip end thereof is curved surface 109, and an angle formed between side surface 110 and light guide body lower surface 112 is angle θ2, reflected light at side surface 110 with a large inclined angle becomes reflected light toward light source 101 (refer to FIG. 1) side, that is, light beams with angles approximately from the Y axis direction in the negative X axis direction in the XY plane. Reflected light at curved surface 109 of the tip end becomes reflected light toward the opposite side to light source 101 (refer to FIG. 1), that is, light beams with angles approximately from the Y axis direction in the positive X axis direction in the XY plane. As mentioned above, curved surface 109 is provided at the tip end of second dot 108 is provided in addition to side surface 110, and thus light beams in which light is widely spread in the XY plane can be formed. An amount of light emitted from light guide body 104 in the Y axis direction due to light reflection at second dot 108 is approximately proportional to a depth of second dot 108. Therefore, an amount of light propagating through light guide body 104 is large at a location close to light source 101, and, at a location becoming distant from light source 101, some of light beams 120 are emitted outward of light guide body 104 due to second dot 108, and thus an amount of light propagating through light guide body 104 is gradually reduced. Thus, in a case where the entire light guide body 104 is caused to emit light uniformly with the same luminance, if there is no first dot 106, it is necessary to reduce depth h2 of the second dot on light source 101 side, and to increase depth h2 of second dot 108 as a location becomes more distant from light source 101, in order to reduce an amount of light emitted from light source 101 side. As a length of light guide body 104 increases, it is necessary to reduce a depth of second dot 108 on light source 101 side. In order to increase depth h2 of second dot 108, an arrangement interval of second dots 108 in the X axis direction is required to be increased, and thus light emitted from light guide body 104 causes bright spots at a rough interval to be viewed, that is, unevenness to be viewed, and thus display quality deteriorates.

Figure 9:
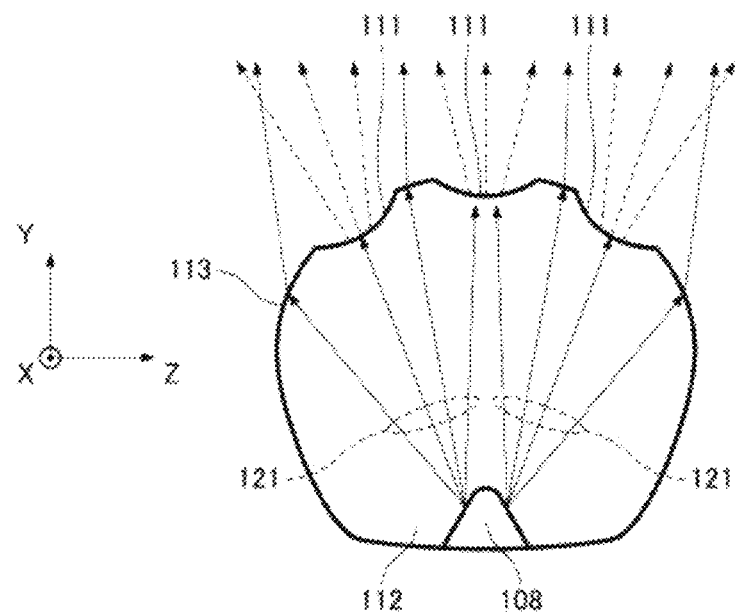
FIG. 9 is a diagram illustrating a state in which light reflected from the second dot is emitted from the light guide body in a YZ plane in one embodiment of the present invention.

FIG. 9 is a diagram illustrating light beams in light guide body 104 in the YZ plane. In FIG. 9, the same constituent elements as in FIGS. 1 and 8 are given the same reference numerals, and description thereof will be omitted. Light beams 121 reflected at second dot 108 formed on light guide body lower surface 112 are emitted from second dot 108 as light beams 121 which are spread centering on the Y axis direction. Light guide body upper surface 113 has a lens shape in the YZ plane, and the lens shape is formed so that a focal point position of the lens is located at the bottom center of second dot 108. Generally, a light beam passing through the focal point position of the lens becomes a light beam which is parallel to a lens optical axis, that is, a straight line connecting the center of the lens to the lens focal point position, due to the lens. As a position of a light beam becomes more distant from the focal point position of the lens, the light beam is emitted with a large angle with respect to the lens optical axis. Since a width of second dot 108 in a YZ section is sufficiently smaller than light guide body upper surface 113 having the lens shape, a light beam reflected at and emitted from second dot 108 becomes a light beam passing through a position close to the focal point position of the lens shape of light guide body upper surface 113, and thus light emitted from light guide body upper surface 113 is emitted as light similar to parallel light. Since grooves 111 are formed on light guide body upper surface 113, among light beams emitted from second dot 108, light beams which are incident to grooves 111 are diffused so as to become light beams which are spread in the YZ plane. Since grooves 111 are disposed with an interval on light guide body upper surface 113, light emitted from second dot 108 is emitted as light beams in which widely spread light beams emitted from grooves 111 and directional light beams which are parallel to the Y axis direction are combined with each other. With this configuration, it is possible to perform lighting in which display with high luminance can be displayed, and display is viewed at a wide angle in the YZ plane, when viewed from the Y axis direction.

Figure 10:
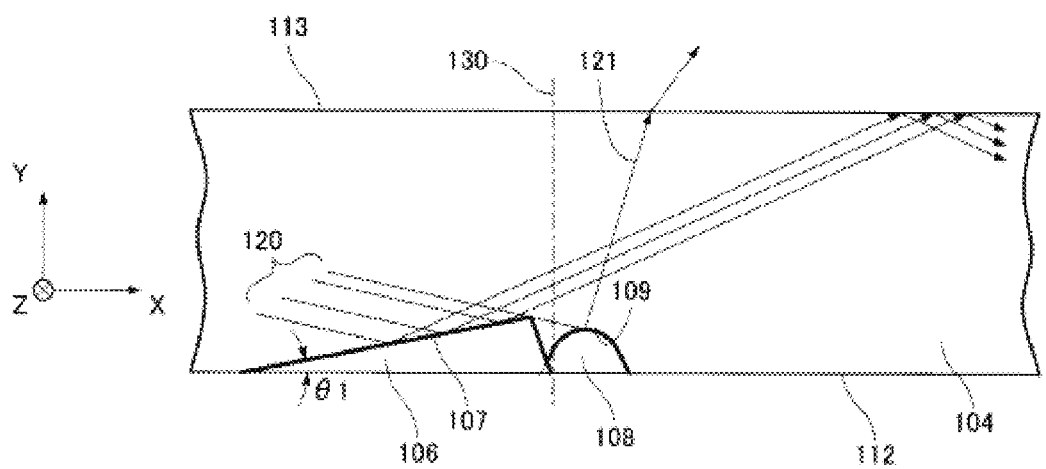
FIG. 10 is a diagram illustrating light reflection at a first dot and the second dot in the XY plane in one embodiment of the present invention.
Figure 11:
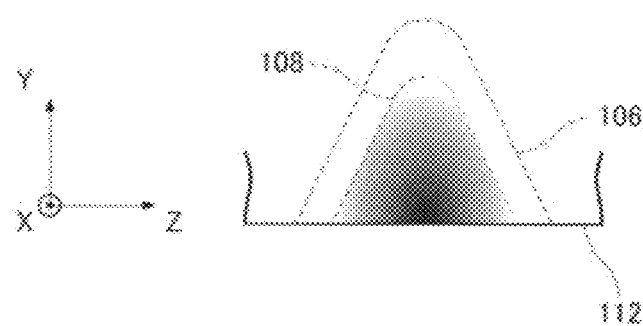
FIG. 11 is a diagram illustrating light reflection at the first dot and the second dot in the XY plane in one embodiment of the present invention.
Figure 12:
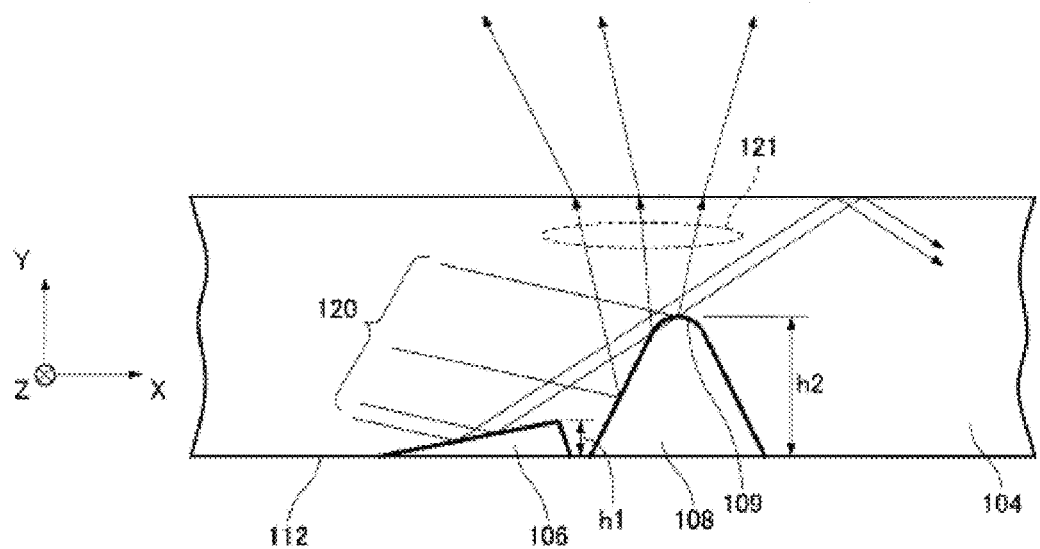
FIG. 12 is a diagram illustrating light reflection at the first dot and the second dot in the XY plane in one embodiment of the present invention.

FIGS. 10 to 12 are diagrams illustrating a state in which light is emitted from light guide body 104 by first dot 106 and second dot 108 of light guide body 104. In FIGS. 10 to 12, the same constituent elements as in FIG. 1 are given the same reference numerals, and description thereof will be omitted.

FIG. 10 illustrates light beams at position 105a on light guide body lower surface 112 close to the light source in light guide body 104 in FIG. 1. If light beams 120 propagating through light guide body 104 are incident to inclined surface 107 of first dot 106 on the light source side, angle θ1 of inclined surface 107 on the light source side is small, and thus an azimuth change of reflected light beams is small, and most of the light beams are totally reflected inside light guide body 104 so as to continuously propagate.

FIG. 11 illustrates a light amount distribution right after first dot 106 in the YZ plane at position 130 in the light guide body in FIG. 10. Light beams 120 in light guide body 104 propagate while being totally reflected at the interfaces of light guide body 104, that is, light guide body upper surface 113 and light guide body lower surface 112, and thus a light amount distribution of light guide body 104 in the YZ plane is substantially uniform. If there is first dot 106 on light guide body lower surface 112, a location right after first dot 106 is shielded from light beams, and thus an amount of light is reduced in the location. The light beams propagating through light guide body 104 are spread centering on the X axis direction, and thus the light amount distribution is a distribution in which an amount of light is gradually reduced from the outer shape of first dot 106 inward thereof in the YZ plane at position 130 right after first dot 106.

Second dot 108 is disposed at a location where an amount of light is reduced due to first dot 106 right after first dot 106 in the advancing direction of light beams 120. If first dot 106 is provided compared with the absence of first dot 106, in a case where the same amount of light is emitted from light guide body 104, an amount of emitted light can be reduced even if depth h2 of the second dot is not reduced, and thus depth h2 of the second dot can be increased.

Since an amount of light propagating through light guide body 104 is large in the vicinity of light source 101, if there is no first dot 106, the number of light beams 121 reflected at second dot 108 and emitted from light guide body 104 increases, and thus the number of light beams 120 propagating through light guide body 104 is reduced. Thus, in order to suppress reflection at second dot 108, a depth of second dot 108 is required to be considerably small, and thus it is difficult to manufacture light guide body 104. In contrast, if first dot 106 is provided, it is not necessary to form second dot 108 to be shallow, and thus it becomes easier to manufacture light guide body 104. If first dot 106 is provided, a depth of the easily manufactured second dot can be secured, and it is possible to reduce an amount of light emitted from light guide body 104 due to second dot 108 even in the vicinity of light source 101 in which the number of light beams propagating through light guide body 104 is large.

FIG. 12 illustrates light beams at position 105*b* on light guide body lower surface 112 in the vicinity of the center of light guide body 104 in FIG. 1.

Depth h1 of first dot 106 is reduced as the first dot becomes more distant from light source 101 side, but, conversely, depth h2 of second dot 108 is increased. Therefore, the depth of first dot 106 is smaller than the depth of second dot 108 at position 105*b* on light guide body lower surface 112. If a gap between first dot 106 and second dot 108 is increased as a location becomes more distant from light source 101, second dot 108 is hardly influenced by a reduction in an amount of light due to first dot 106. Light beams 120 propagating through light guide body 104 are gradually emitted as light beams 121 from light guide body 104 in the Y axis direction due to second dot 108 disposed on light guide body lower surface 112, and an amount of light propagating through light guide body 104 is reduced. Thus, it is necessary to increase an amount of light emitted from light guide body 104 by increasing a depth of second dot 108, but a depth of first dot 106 is reduced, and overlapping between first dot 106 and second dot 108 in the X direction in the YZ plane is also reduced. Therefore, an amount of light which is incident to second dot 108 is increased, and thus an increase of a depth of second dot 108 may be slight.

At position 105*c* close to the edge surface on the opposite side to the light source on light guide body lower surface 112 in FIG. 1, only second dot 108 is disposed on light guide body lower surface 112, and thus light beams 121 are reflected at second dot 108 so as to be emitted from light guide body 104 in the same manner as in FIG. 8.

Figure 13:
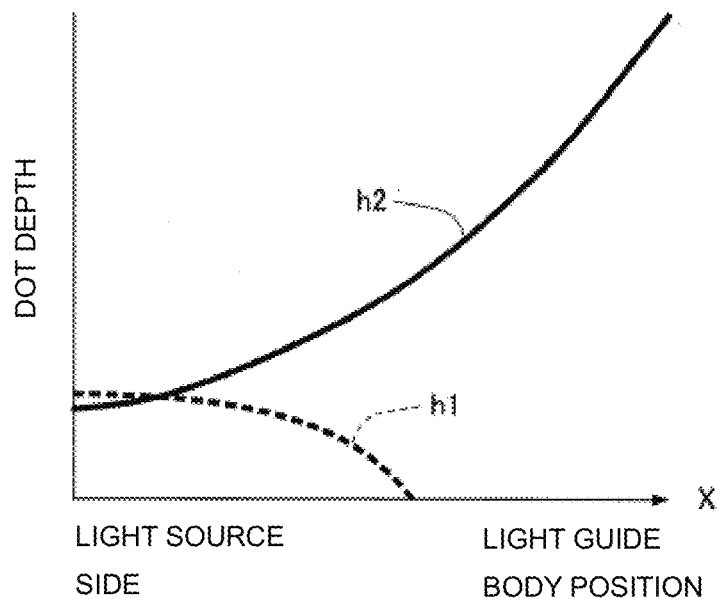
FIG. 13 is a diagram for explaining a relationship between a change in a depth and a change in an amount of emitted light at positions of the first dot and the second dot in the light guide body in one embodiment of the present invention.
Figure 14:
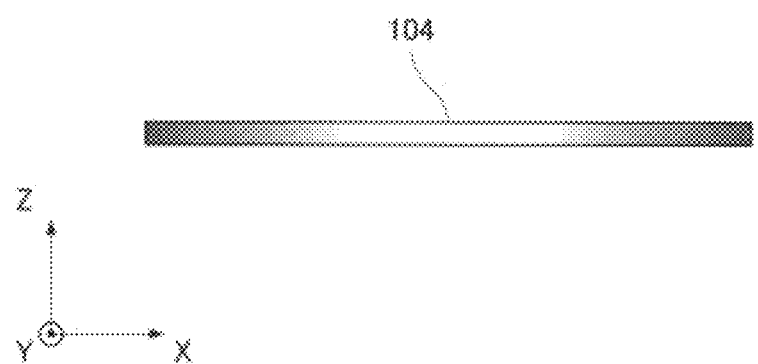
FIG. 14 is a diagram for explaining a relationship between a change in a depth and a change in an amount of emitted light at positions of the first dot and the second dot in the light guide body in one embodiment of the present invention.

FIGS. 13 to 16 are diagrams for explaining a relationship between changes in depths of first dot 106 and second dot 108 and a change in an amount of light emitted from light guide body 104 in the Y axis direction. FIG. 13 is a diagram illustrating depth h1 of first dot 106 and depth h2 of second dot 108 in gradation display in which an amount of emitted light on light source 101 (refer to FIG. 1) side is small, an amount of emitted light in the vicinity of the center of light guide body 104 is large, and an amount of emitted light of light guide body 104 on the opposite side to light source 101 is small. FIG. 14 is a diagram illustrating a light emission amount distribution regarding light emitted from light guide body 104 viewed from the Y axis direction at the depths of first dot 106 and second dot 108, corresponding to FIG. 13.

Depth h1 of first dot 106 on light source 101 side is larger than depth h2 of second dot 108, that is, a relationship of h1>h2 is satisfied, and thus an amount of light reflected at second dot 108 (refer to FIG. 1) and emitted from light guide body 104 can be reduced. As a location becomes more distant from light source 101, depth h1 of first dot 106 is reduced, depth h2 of second dot 108 is increased, and thus it is possible to increase an amount of light emitted from light guide body 104 over the vicinity of the center of light guide body 104. An amount of light propagating through light guide body 104 is reduced from the vicinity of the center of light guide body 104, and thus an amount of light emitted from light guide body 104 is gradually reduced. A position where an amount of light emitted from light guide body 104 is the maximum may be changed by adjusting depth h1 of first dot 106 and depth h2 of second dot 108 from the light source to the vicinity of the center of light guide body 104.

Figure 15:
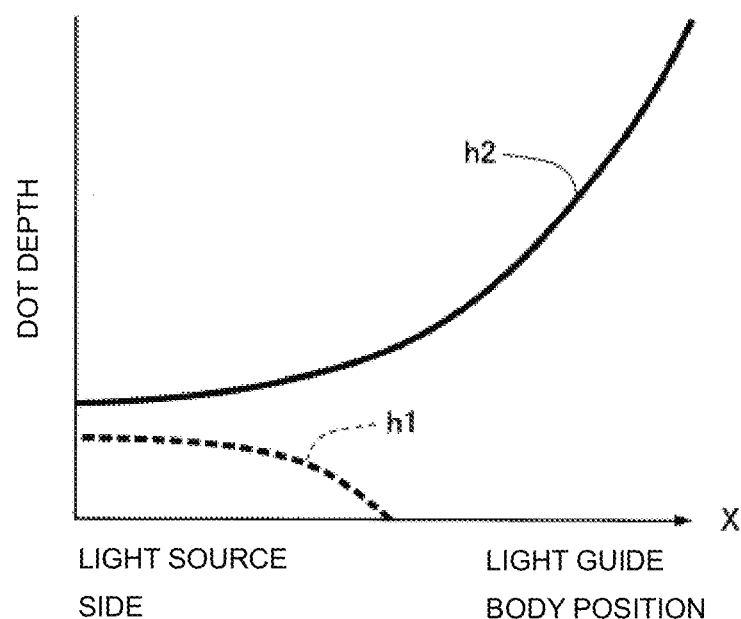
FIG. 15 is a diagram for explaining a relationship between a change in a depth and a change in an amount of emitted light at positions of the first dot and the second dot in the light guide body in one embodiment of the present invention.
Figure 16:
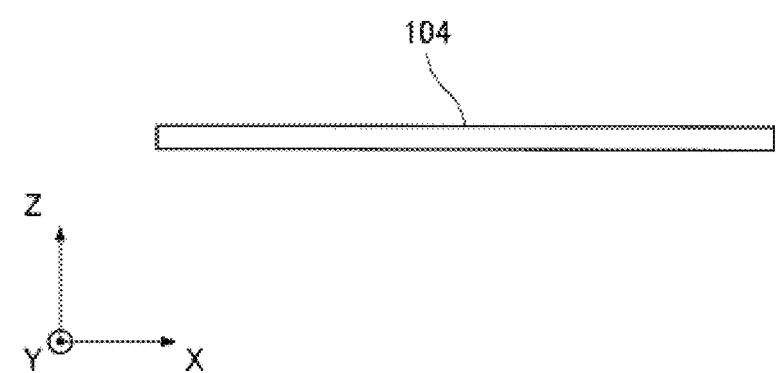
FIG. 16 is a diagram for explaining a relationship between a change in a depth and a change in an amount of emitted light at positions of the first dot and the second dot in the light guide body in one embodiment of the present invention.

FIG. 15 is a diagram illustrating depths of first dot 106 and second dot 108 at which an amount of light emitted from light guide body 104 in the Y axis direction is substantially uniform in the entire light guide body. FIG. 16 is a diagram illustrating a distribution of an amount of light emitted from light guide body 104, viewed from the Y axis direction at depth h1 of first dot 106 and depth h2 of second dot 108, corresponding to FIG. 15.

Depth h1 of first dot 106 on light source 101 side is made to be smaller than depth h2 of second dot 108, and thus it is possible to adjust an amount of light emitted from light guide body 104. Depths of first dot 106 and second dot 108 are set not to be too small. As a location becomes more distant from light source 101, depth h1 of first dot 106 is reduced, depth h2 of second dot 108 is increased, and thus an amount of light emitted from light guide body 104 is adjusted. Therefore, light can be uniformly emitted from the entire light guide body 104.

As mentioned above, a plurality of pairs of first dots 106 and second dots 108 are formed in light guide body 104, and inclined surface 107 and side surface 110 as side surfaces of first dot 106 and second dot 108 on the light source 101 side are formed so that an inclination of side surface 110 with respect to light guide body lower surface 112 is larger than that of inclined surface 107. In the vicinity of light source 101, depth h1 of first dot 106 is larger than depth h2 of second dot 108, and, as a location comes closer to the end on the opposite side to light source 101, depth h1 of first dot 106 is reduced, and depth h2 of second dot 108 is increased. Depth h1 of first dot 106 may be gradually reduced as a location becomes more distant from light source 101, and depth h2 of second dot 108 may be gradually increased as a location becomes more distant from light source 101. First dot 106 may not be provided at the end on the opposite side to light source 101. A length of inclined surface 107 may be reduced as a location becomes more distant from light source 101, and a length of the side surface may be increased as a location becomes more distant from light source 101. According to such a configuration, a depth of second dot 108 can be increased as a result of disposing first dot 106 right before second dot 108 on light guide body lower surface 112 on light source 101 side, and thus it is possible to easily manufacture a light guide body. Since an amount of light emitted from light guide body 104 can be gradually increased from a state close to 0 while securing a sufficient depth causing second dot 108 to be easily manufactured, an amount of emitted light is reduced in the vicinity of light source 101 in which the number of propagating light beams is large, and an amount of irradiation light is increased in a region which is separated from light source 101 in which the number of propagating light beams is small. Therefore, an amount of irradiation light can be uniform in the entire of light guide body 104, and thus it is possible to improve display quality. Since an interval between second dots 108 in the X axis direction can be reduced, it is possible to perform smooth display and thus to improve display quality.

Figure 17:
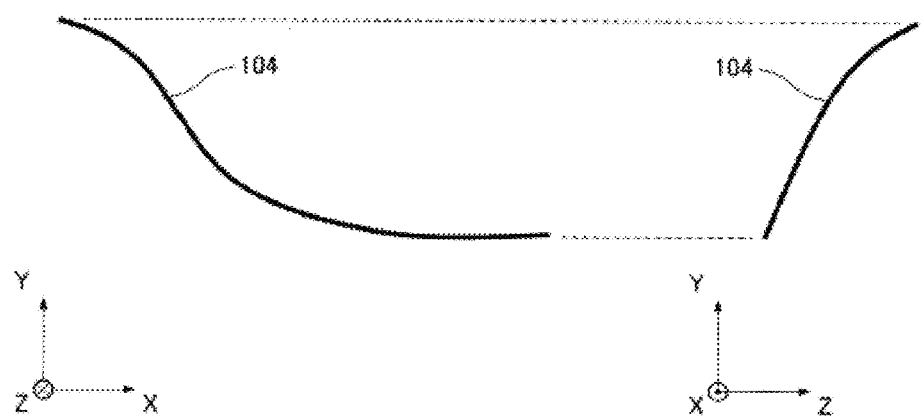
FIG. 17 is a diagram illustrating a case where the light guide body is disposed to be curved in one embodiment of the present invention.

In FIG. 1, light guide body 104 is formed in a linear shape, but, as illustrated in FIG. 17, may be formed in a curved shape in a three-dimensional space.

An arrangement interval of second dots 108 is equal, but the interval may be changed.

The number of grooves 111 formed on light guide body upper surface 113 in the longitudinal direction is not limited to three, and may be one, two, or four or more. Alternatively, in a case where spreading of light emitted from light guide body 104 is reduced, grooves 111 may be omitted.

A sectional shape of first dot 106 in the YZ plane may be similar to that of second dot 108, but may not be similar if first dot 106 is slightly larger than second dot 108. The tip end of inclined surface 107 of first dot 106 on the light source side may be formed in a shape with an acute angle instead of a curved shape.

Second dot 108 has a rotation symmetric shape centering on the Y axis, but the central axis of the dot may be inclined from the Y axis. For example, the central axis may be inclined in the negative X axis direction or the positive X axis direction in the XY plane.

Figure 18:
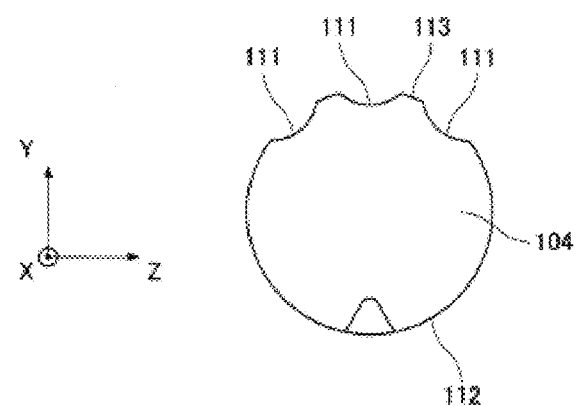
FIG. 18 is a diagram illustrating a case where a shape of the light guide body in the YZ plane is a circular shape in one embodiment of the present invention.

Regarding a sectional shape of light guide body 104 in the YZ plane, the upper surface has an aspherical lens shape, but, as illustrated in FIG. 18, a YZ section of light guide body 104 may have a circular shape, that is, light guide body upper surface 113 and light guide body lower surface 112 may have a semicircular shape. Since light guide body upper surface 113 has an aspherical lens shape, and grooves 111 are used, spreading of light in the YZ plane can be adjusted from a state of being close to parallel light, but, if a sectional shape of light guide body 104 is a circular shape, light is widely spread even though spreading of light in the YZ plane cannot be made in a state of being close to parallel light, and thus spreading of light can be used for various applications.

Figure 19:
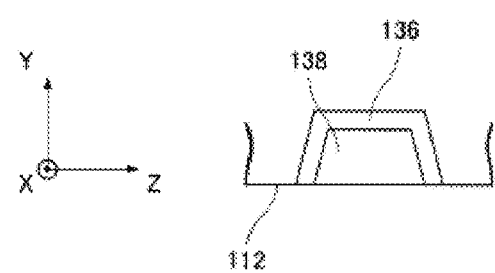
FIG. 19 is a diagram illustrating a case where sectional shapes of the first dot and the second dot in the YZ plane are trapezoidal shapes in one embodiment of the present invention.

Second dot 108 has a small sectional area in the YZ plane since the tip end thereof is curved surface 109, and side surface 110 thereof is a conical surface, and this is advantageous in that a dot depth can be increased, but, as illustrated in FIG. 19, a sectional shape of second dot 108 in the YZ plane may be trapezoidal shape 138, and a sectional shape of the first dot in the YZ plane may be trapezoidal shape 136.

Figure 20:
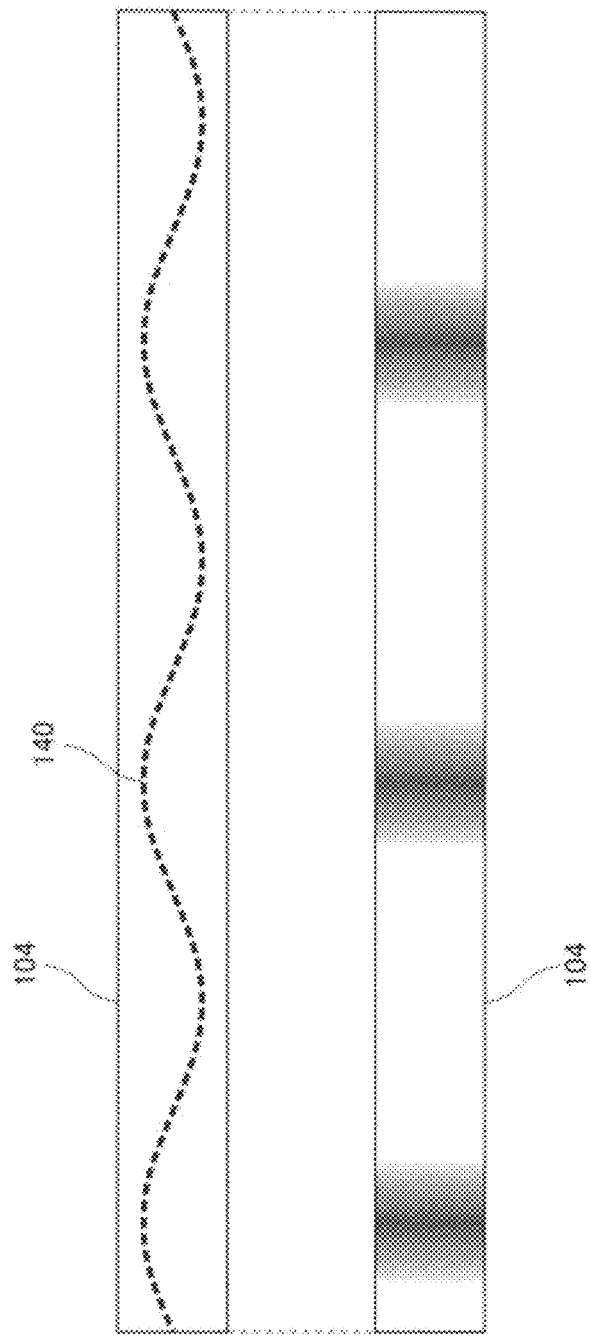
FIG. 20 is a diagram illustrating arrangement of the first dot and the second dot and a change in an amount of emitted light in a longitudinal direction of the light guide body in one embodiment of the present invention.
Figure 21:
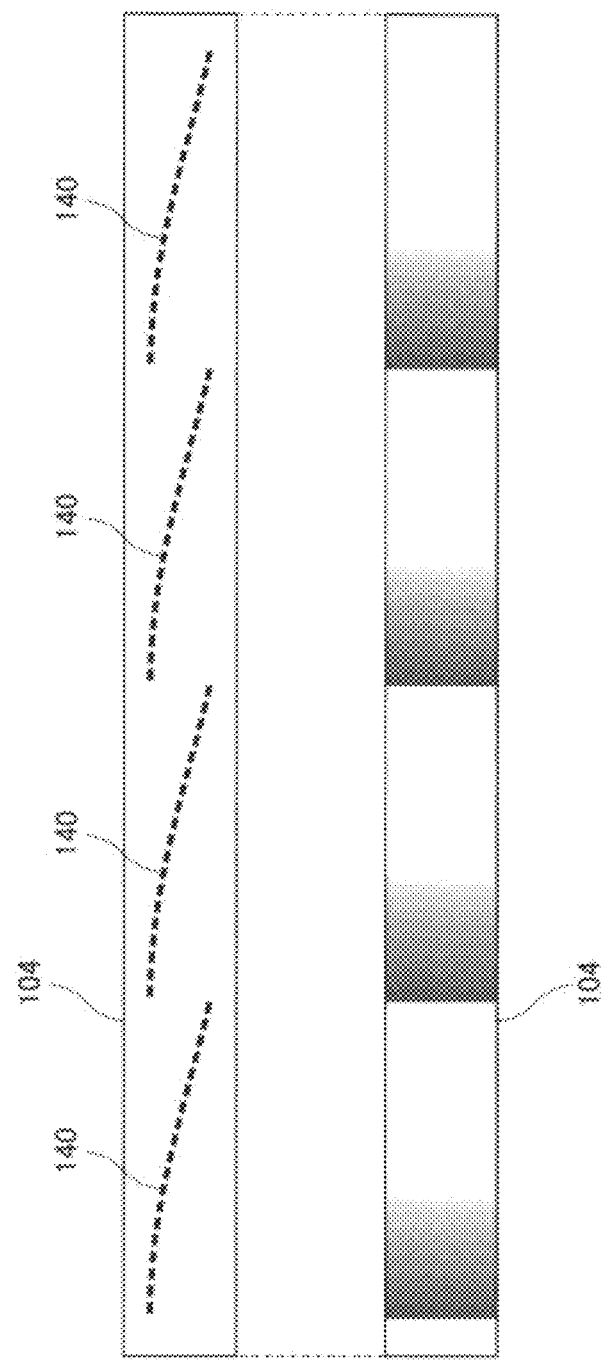
FIG. 21 is a diagram illustrating arrangement of the first dot and the second dot and a change in an amount of emitted light in a longitudinal direction of the light guide body in one embodiment of the present invention.

Arrangement 140 of first dot 106 and second dot 108 are disposed at the center of light guide body 104, but, as illustrated in FIG. 20, may be changed in a sine wave shape, and thus an amount of emitted light in the Y axis direction can be changed in a sine wave shape. Alternatively, as illustrated in FIG. 21, arrangement 140 is obliquely disposed with a small angle with respect to the X axis in a short length, and thus an amount of emitted light in the Y axis direction can be changed. In other words, arrangement 140 is divided into a plurality of lines, and each arrangement may be disposed with an angle with respect to the X axis direction.

A light-transmissive cover may be further provided to surround light guide body 104 and light source 101, and a thin emboss may be formed on a rear surface of the light-transmissive cover, that is, a surface facing light guide body 104 so that light is weakly emitted from the cover.

A plurality of cylindrical surfaces having a cylindrical axis which is parallel to the Z axis direction may be formed on the rear surface of the light-transmissive cover so that a spread angle of light emitted from light guide body 104 is increased.

Figure 22:
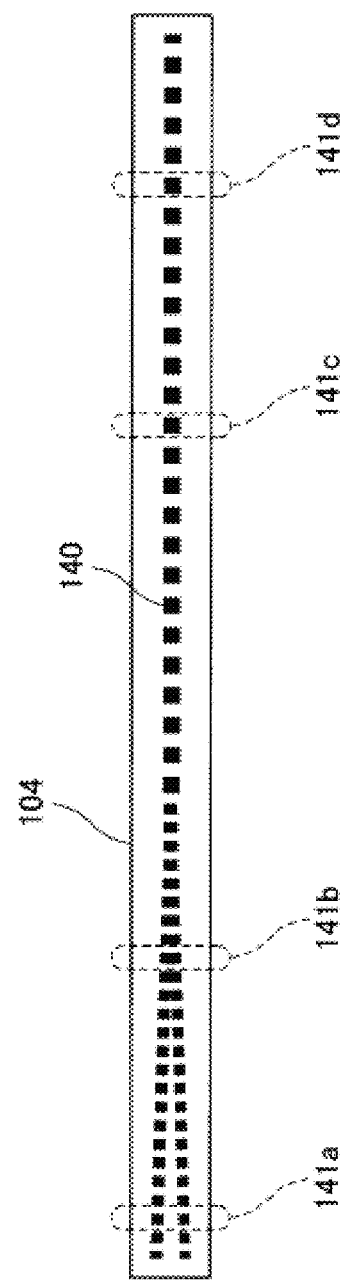
FIG. 22 is a diagram illustrating a state in which the first dot and the second dot are arranged in two rows on a light source side in the longitudinal direction of the light guide body in one embodiment of the present invention.
Figure 23:
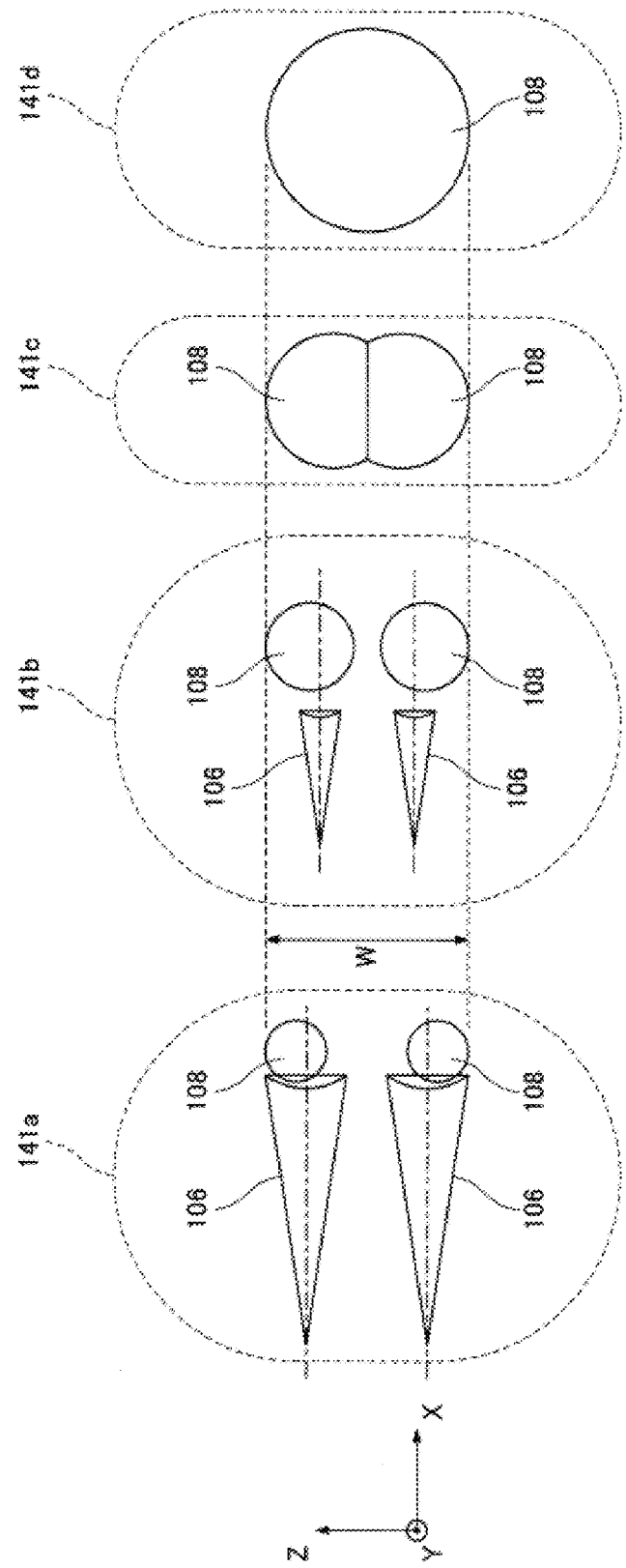
FIG. 23 is a diagram illustrating forms of the first dot and the second dot which are arranged in two rows on the light source side in the longitudinal direction of the light guide body.
Figure 24:
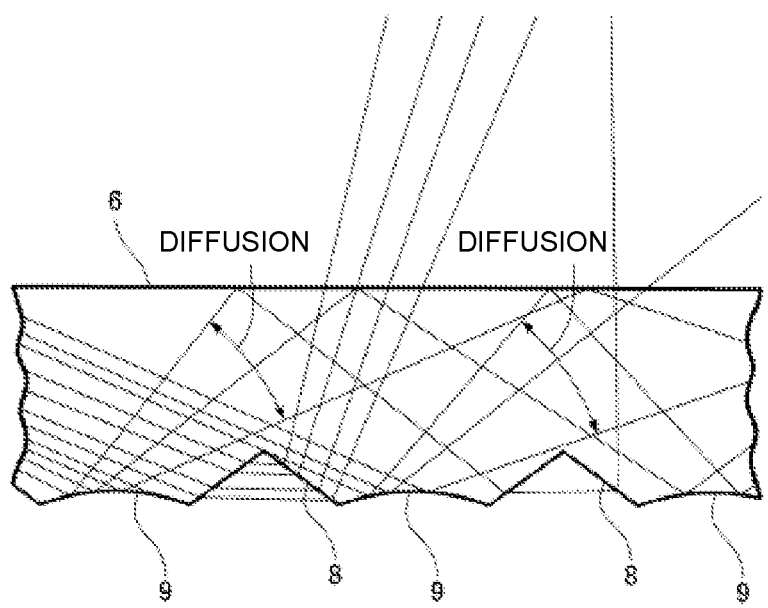
FIG. 24 is a diagram illustrating a prism shape of a line lighting display device of the related art disclosed in PTL 1.

As illustrated in FIG. 22, when viewed from the Y axis, arrangement 140 of first dot 106 and second dot 108 may not be disposed in one row, and arrangement 140 in a region ranging over a predetermined distance from light source 101 (refer to FIG. 1) may be disposed in two rows, and may be combined into one row as a location becomes more distant from light source 101. FIG. 23 is an enlarged view of first dot 106 and second dot 108 illustrated in FIG. 22. In FIG. 23, first dots 106 and second dots 108 at light guide body positions 141a, 141b, 141c and 141d in FIG. 22 are illustrated, and first dots 106 and second dots 108 in the middle are not illustrated.

As exemplified in FIG. 23, pairs of first dots 106 and second dots 108 are arranged in two rows in the Z axis direction at light guide body position 141a. The centers of first dot 106 and second dot 108 are slightly deviated. The centers are deviated in a direction of a gap between first dots 106 being larger than a gap between second dots 108 in the Z axis direction. At light guide body position 141b, as a location becomes more distant from light source 101, first dot 106 becomes shallower and smaller, and second dot 108 becomes deeper and larger. At light guide body position 141c, first dot 106 is removed, and two second dots 108 in the Z axis direction overlap each other. At light guide body position 141d, second dots 108 are completely integrated into a dot. In other words, third dots corresponding to second dots 108 are arranged on the positive X axis direction with light guide body position 141c as a boundary. At light guide body positions 141a, 141b, 141c and 141d, second dots 108 are disposed so that arrangement widths w of second dots 108 in the Z axis direction are substantially the same as each other. Here, in a case where second dot 108 is formed of a dot as at light guide body position 141d, arrangement width w of second dots 108 indicates a width thereof in the Z axis direction, and, in a case where second dot 108 is formed of two dots as at light guide body positions 141a, 141b and 141c, arrangement width w indicates a distance between outer circumferences of the two dots in the Z axis direction. As mentioned above, width w of second dot 108 in the Z axis direction is made to be substantially constant regardless of a distance from light source 101, and thus spreading of light emitted from light guide body 104 in the Y axis direction can be made to be substantially uniform. This is because, in the YZ plane, light guide body upper surface 113 (refer to FIG. 1) has a lens shape, and a focal point position of the lens is disposed approximately near the bottom center of second dot 108 formed on light guide body lower surface 112 (refer to FIG. 1), and thus reflected light at second dot 108 becomes a light beam which is parallel to the Y axis direction in light guide body upper surface 113. At this time, spreading of light in light guide body upper surface 113 changes due to the width of the second dot in the Z axis direction. If the width of the second dot in the Z axis direction is small, light is approximated to parallel light, and if the width in the Z axis direction is large, light becomes widely spread light. Since second dots 108 are disposed in two rows on light source 101 side, a width of the outer shape of the second dots is increased, and a width of the outer shape of second dots 108 in the longitudinal direction of light guide body 104 is made to be constant, spreading of light emitted from light guide body upper surface 113 can be made to be substantially uniform.

Light guide body 104 may have a configuration in which there is a cavity inside thereof, and there is no cavity inside thereof, and may have a configuration in which a light beam propagates. In a case where there is no cavity inside the light guide body, first dot 106 and second dot 108 are formed on light guide body lower surface 112 by recessing the surface of light guide body 104. In a case where there is a cavity inside the light guide body, first dot 106 and second dot 108 may be formed on light guide body lower surface 112 by recessing the surface of light guide body 104, and may be formed of protrusions which protrude in an internal direction of the cavity on light guide body lower surface 112. In a case of the protrusion, a depth of the dot corresponds to a height of the protrusion.

INDUSTRIAL APPLICABILITY

The present invention is suitable for a light guide body which can easily increase display quality of light even in a case of a long light guide body and can perform lighting by reflecting a light beam from a light source, and a line lighting display device or the like having the light guide body.

The invention claimed is:

1. A light guide body which has an upper surface and a lower surface, and causes at least some of light which is incident from one end of the light guide body to propagate to the other end of the light guide body so that irradiation light is emitted from the upper surface, the light guide body comprising:
    first dots that are formed from the lower surface toward the upper surface and are arranged on the lower surface; and
    second dots that are formed from the lower surface toward the upper surface and are arranged on the lower surface,
    wherein at least some of the light reflected at the second dots becomes the irradiation light,
    wherein a plurality of pairs each of which is formed of a first dot and a second dot adjacent to each other are arranged,
    wherein, in each pair, the first dot is disposed beside the second dot on the one end,
    wherein, in each pair, an inclined angle of a surface of the first dot on the one end with respect to the lower surface is smaller than an inclined angle of a surface of the second dot on the one end with respect to the lower surface,
    wherein, in a pair disposed at a position closest to the one end, a depth of the first dot is larger than a depth of the second dot, and
    wherein, in pairs adjacent to each other, a depth of the first dot is increased as the first dot comes closer to the one end, and a depth of the second dot is reduced as the second dot comes closer to the one end.

2. The light guide body of claim 1,
wherein, in each pair, a length of the first dot in a propagation direction of the light on the lower surface is larger than a length of the second dot in the propagation direction of the light on the lower surface.

3. The light guide body of claim 2,
wherein a gap between the first dot and the second dot becomes smaller as the pair comes closer to the one end.

4. The light guide body of claim 3,
wherein, in one or a plurality of the pairs disposed in a region within any range, adjacent to the one end, the first dot and the second dot at least partially overlap each other.

5. The light guide body of claim 4,
wherein a length of a portion where the first dot and the second dot overlap each other is increased as the pair comes closer to the one end.

6. The light guide body of claim 5,
wherein third dots corresponding to the second dots are arranged on the other end of the plurality of arranged pairs.

7. The light guide body of claim 5,
wherein, in a region within any range, adjacent to the one end, the pairs of the first dots and the second dots are arranged in two or more rows.

8. The light guide body of claim 5,
wherein the second dot has a tip end on an upper surface which is a curved surface, and a side surface which is a conical surface.

9. The light guide body of claim 8, further comprising:
a plurality of grooves that are disposed in parallel to the propagation direction of the light and are formed on the upper surface.

10. A line lighting display device comprising:
the light guide body of claim 1; and
a light source that is disposed on the one end of the light guide body and applies the light to an inside of the light guide body.

* * * * *